(12) United States Patent
Mueller

(10) Patent No.: US 10,710,558 B2
(45) Date of Patent: Jul. 14, 2020

(54) CLEANING DEVICE

(71) Applicant: Michael Mueller, Bad Staffelstein (DE)

(72) Inventor: Michael Mueller, Bad Staffelstein (DE)

(*) Notice: Subject to any disclaimer, the term of this patent is extended or adjusted under 35 U.S.C. 154(b) by 165 days.

(21) Appl. No.: 15/798,793

(22) Filed: Oct. 31, 2017

(65) Prior Publication Data

US 2018/0118173 A1 May 3, 2018

(30) Foreign Application Priority Data

Oct. 31, 2016 (DE) .................. 10 2016 221 406

(51) Int. Cl.
| | | |
|---|---|---|
| B24B 23/02 | (2006.01) | |
| B60S 3/04 | (2006.01) | |
| B24B 5/01 | (2006.01) | |
| B24D 5/16 | (2006.01) | |
| B24D 7/16 | (2006.01) | |
| B24B 15/00 | (2006.01) | |
| B24B 5/44 | (2006.01) | |
| B60S 3/06 | (2006.01) | |

(52) U.S. Cl.
CPC ............... *B60S 3/042* (2013.01); *B24B 5/01* (2013.01); *B24B 5/44* (2013.01); *B24B 15/00* (2013.01); *B24D 5/16* (2013.01); *B24D 7/16* (2013.01); *B60S 3/06* (2013.01)

(58) Field of Classification Search
CPC ....................................................... B24B 23/02
USPC .... 451/359, 490, 526, 57, 58, 461, 548, 549
See application file for complete search history.

(56) References Cited

U.S. PATENT DOCUMENTS

| | | | |
|---|---|---|---|
| 152,442 A | | 6/1874 | Walters |
| 2,673,425 A | * | 3/1954 | Karnell .................... B24D 7/14 |
| | | | 451/548 |
| 2,728,929 A | | 1/1956 | Bell |
| 2,978,846 A | | 4/1961 | Barron |
| 3,118,162 A | | 1/1964 | Karr et al. |
| (Continued) | | | |

FOREIGN PATENT DOCUMENTS

| | | |
|---|---|---|
| DE | 29908732 U1 | 10/2000 |
| DE | 202015001308 U1 | 4/2015 |
| (Continued) | | |

OTHER PUBLICATIONS

Office Action in corresponding EP Appl. No. 17198354.7 dated Mar. 21, 2018 {pp. 1-7}.
(Continued)

*Primary Examiner* — Robert A Rose
(74) *Attorney, Agent, or Firm* — Millen, White, Zelano & Branigan, P.C.; William F. Nixon

(57) ABSTRACT

A cleaning device for cleaning and/or polishing a surface having an aperture, such as a wheel rim contact surface of a motor vehicle or the like, comprises a housing, which has a rear rotary portion for rotating the housing about a rotational axis and a front fastening portion for releasably fastening a cleaning body; the cleaning body comprising a stabilising plate which faces the housing and has a centring pin that faces away from the housing and projects centrically towards the outside, and a cleaning means that covers the surface of the stabilising plate that faces away from the housing; and the fastening portion and the stabilising plate each having a corresponding connecting means for rotationally stable connection to one another.

16 Claims, 2 Drawing Sheets

(56) References Cited

U.S. PATENT DOCUMENTS

| | | | |
|---|---|---|---|
| 4,800,686 | A | 1/1989 | Hirabayashi |
| 5,899,796 | A * | 5/1999 | Kamiyama ............. E21B 29/06 |
| | | | 166/55.7 |
| 6,802,765 | B1 * | 10/2004 | Torrez ....................... B08B 1/04 |
| | | | 451/344 |
| 7,356,867 | B1 | 4/2008 | Beiermann |
| 9,682,456 | B1 | 6/2017 | McGeary |
| 2005/0172437 | A1 | 8/2005 | Wachter |
| 2008/0047085 | A1 | 2/2008 | Kolarevic et al. |

FOREIGN PATENT DOCUMENTS

| | | |
|---|---|---|
| EP | 0242174 A1 | 10/1987 |
| WO | 2004/034838 A1 | 4/2004 |

OTHER PUBLICATIONS

English Machine Translation of DE 29908732 U1 published Oct. 26, 2000.

* cited by examiner

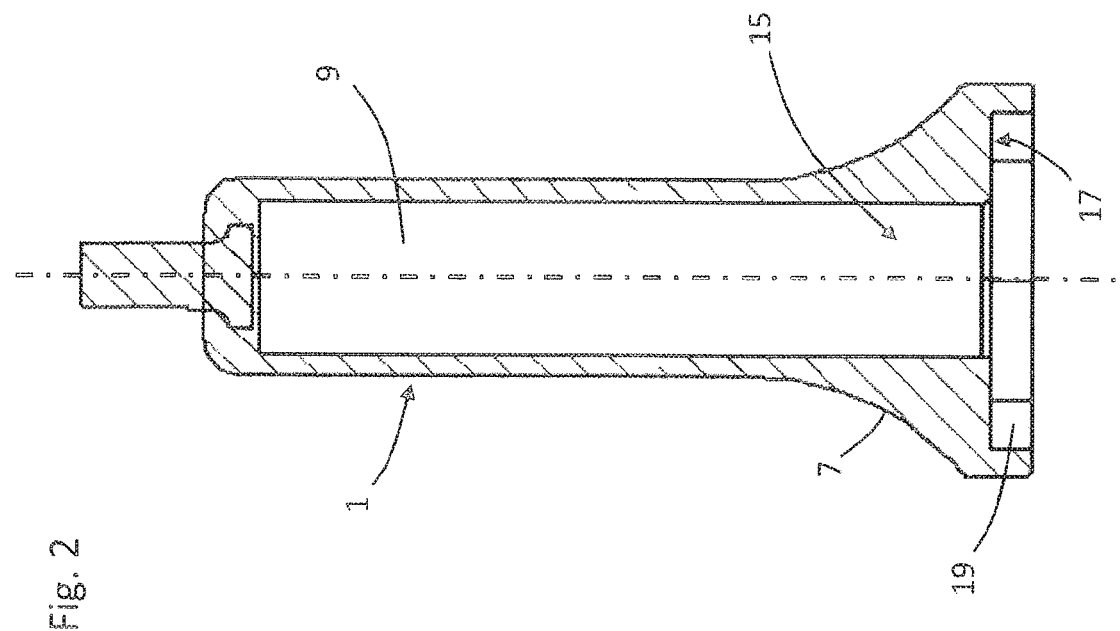
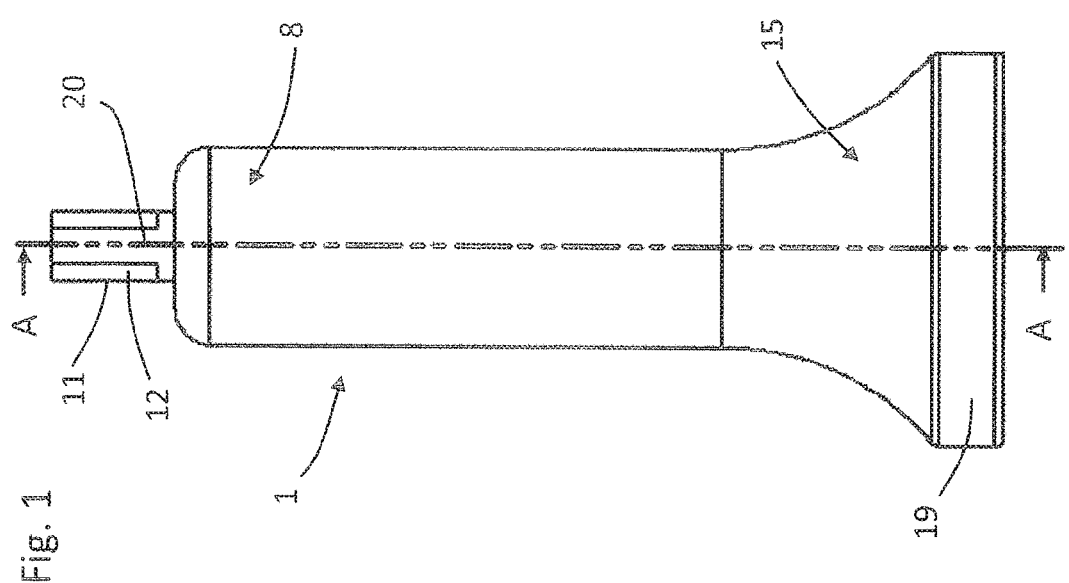

CLEANING DEVICE

FIELD OF THE INVENTION

The invention relates to a cleaning device for cleaning and/or polishing a surface having an aperture, such as a wheel rim contact surface of a motor vehicle or the like.

Although the present invention can be applied to any surface, said invention and the problem it addresses are explained in greater detail in relation to a process for cleaning a wheel rim contact surface of a motor vehicle.

BACKGROUND OF THE INVENTION

When changing motor vehicle wheels, for example from summer tyres to winter tyres or vice versa, the motor vehicle wheel rims are connected to a motor vehicle wheel hub for connection to the drive shaft. In this case, an outward-facing flange surface of the motor vehicle wheel hub functions as a support for an inner rim portion. In the process, an axle that projects from said flange can be brought into engagement with a receptacle that is provided in the motor vehicle rim. When changing a motor vehicle wheel, the inner rim portion should be cleaned of deposits, rust oxidation, dirt or the like by means of cleaning and/or polishing before fitting the new wheel, in order to ensure planar fitting of the rim on the associated flange surface.

Known cleaning devices are not capable of suitably preventing the cleaning device from slipping when a wheel rim contact surface is being cleaned, and therefore damage can be caused to the wheel rim and the tool, in particular when the contact pressure is high.

SUMMARY OF THE INVENTION

One idea of the present invention is to provide a cleaning device of the type mentioned at the outset, which can achieve damage-free cleaning and/or polishing of a wheel rim contact surface.

According to a first aspect of the invention, a cleaning device for cleaning and/or polishing a surface having an aperture, such as preferably a wheel rim contact surface of a motor vehicle or the like, has a housing, which comprises a rear rotary portion for rotating the housing about a rotational axis and a front fastening portion for releasably fastening a cleaning body; the cleaning body comprising a stabilising plate which faces the housing and comprises a centring pin that projects centrically towards the outside and a cleaning means that covers the outer surfaces of the stabilising plate; and the fastening portion and the stabilising plate each having a corresponding connecting means for rotationally stable connection to one another.

According to a second aspect of the invention, a cleaning body for preferably cleaning and/or polishing a surface having an aperture, such as a wheel rim contact surface of a motor vehicle or the like, comprises a stabilising plate, which faces a housing of a cleaning device and has a centrically projecting centring pin that faces away from the housing, and a cleaning means that covers the surface of the stabilising plate that faces away from the housing.

Thus, in comparison with conventional devices, the present invention has the advantage that, when a wheel rim contact surface is being cleaned, the centring pin, which can be introduced into the bearing aperture of the rim, suitably prevents the cleaning device from slipping eccentrically, and therefore no damage can be caused to the wheel rim or the tool, in particular when the contact pressure is high.

According to an embodiment of the present invention, the centring pin is also covered by the cleaning means. Thus, in comparison with conventional devices, the present invention has the advantage that, when a wheel rim of a motor vehicle is being cleaned for example, not only is the planar rim contact surface cleaned of rust oxidation and dirt, but also the inside of the rim opening is cleaned of rust oxidation and dirt by means of the provided centring pin comprising the applied cleaning means.

According to a further embodiment of the present invention, the centring pin has a circular or polygonal cross-sectional shape or the like.

According to a further embodiment of the present invention, the fastening portion comprises an edge portion for centring the received cleaning body.

According to a further embodiment of the present invention, the cleaning means is a rough abrasive.

According to a further embodiment of the present invention, the cleaning means is securely attached to the stabilising plate and/or to the centring pin by means of an adhesive bond or the like.

According to a further embodiment of the present invention, the fastening portion, the stabilising plate and the centring pin each comprise a central opening, which openings are preferably mutually aligned, for receiving a shaft, an axle or the like.

According to a further embodiment of the present invention, the cleaning device has an anti-turn mechanism in the form of an edge or a polygon.

According to a further embodiment of the present invention, the housing is made of polyoxymethylene (POM), aluminium or the like.

BRIEF DESCRIPTION OF THE DRAWINGS

Embodiments of the invention are shown in the drawings and are explained in greater detail in the following description.

In the drawings:

FIG. 1 is a side view of a housing of a cleaning device according to an embodiment of the present invention;

FIG. 2 is a sectional view of the housing from FIG. 1 along the line A-A; and

DETAILED DESCRIPTION OF EMBODIMENTS OF THE INVENTION

Figure 3:
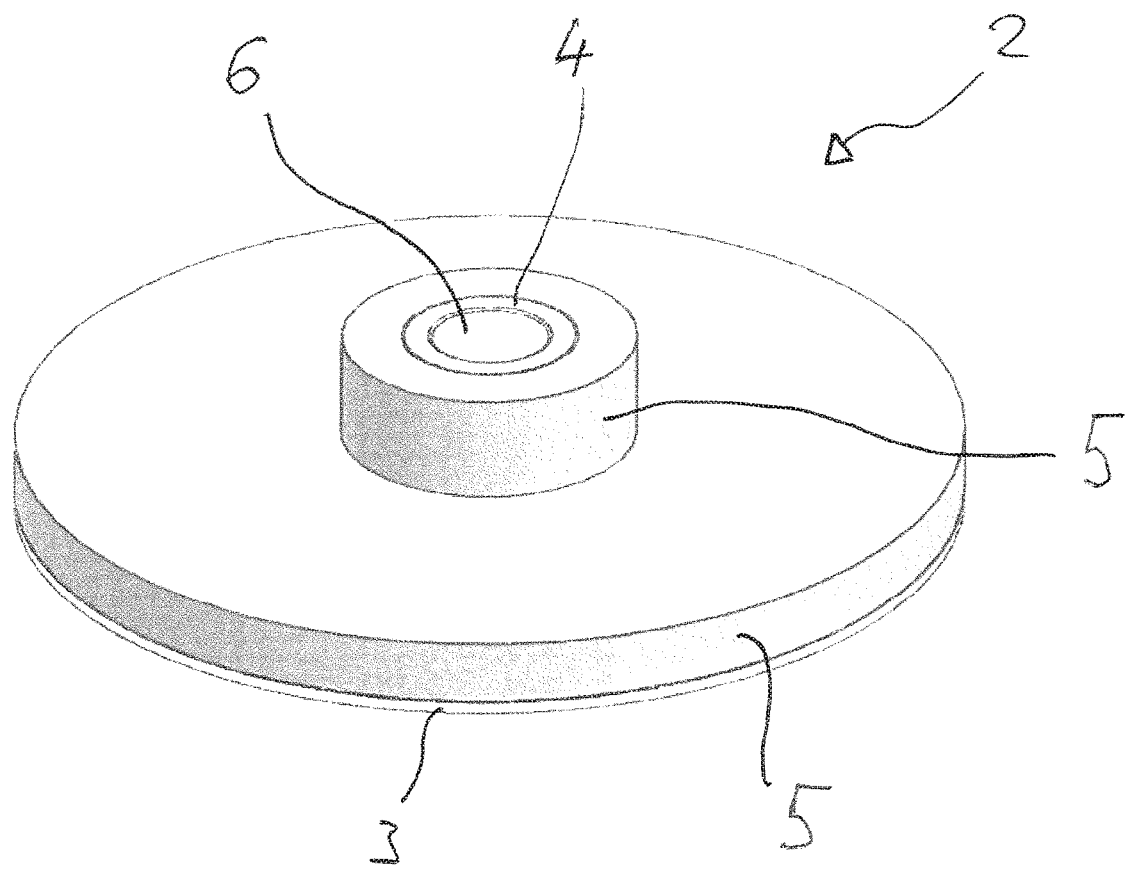
FIG. 3 is a perspective view of a cleaning body of a cleaning device according to an embodiment of the present invention.

With reference first to FIGS. 1 and 2, a cleaning device 1 according to an embodiment of the present invention is explained. FIG. 1 is a side view of a housing of a cleaning device according to an embodiment of the present invention and FIG. 2 is a sectional view of the housing from FIG. 1 along the line A-A.

According to the embodiment, and as shown in FIGS. 1 and 2, the cleaning device 1 comprises a bell-shaped housing 7. The housing 7 may also be crucible-shaped, conical or the like and consists preferably of polyoxymethylene (POM), aluminium or the like. Of course, other materials and shapes having corresponding properties are also conceivable.

The housing 7 comprises a rear rotary portion 8 for rotating the housing 7 about a rotational axis 20, and a front recess portion 15 for receiving a projecting axle or shaft (not shown), which recess portion is arranged around a rotational axis 20 of the housing 7.

The rear rotary portion 8 is formed such that it comprises a smooth surface 9 that can be easily grasped for manual operation and/or for manual guidance. Furthermore, according to the present embodiment, a drive shank 11 is provided at the rear end of the rear rotary portion 8, which drive shank extends coaxially with the rotational axis 20. The drive shank 11 may be formed integrally with the housing 7, for example by means of an injection moulding process, or connected to the housing 7 by means of a screw connection (not shown).

The drive shank 11 preferably comprises, at the end thereof that is remote from the housing 7, a polygonal shank 12, preferably a hexagonal shank 12, for engaging with a drill chuck of a drill for a machine-controlled rotary drive, for example. Alternatively, the drive shank 11 may also comprise a threaded nut or an internal thread in order to be driven by machines, or may also have a polygonal inner profile.

The front recess portion 15 has, for example, a circular cross section, which has a diameter that is adapted to the projecting shaft or axle to be received, i.e. the diameter of the recess portion 15 is at least as large as the diameter of the axle or shaft to be received.

The housing 7 further comprises, in the front region thereof, a fastening portion 17 which is arranged concentrically to the recess portion 15 in order to fasten a cleaning body 2, as shown in FIG. 3. The fastening portion 17 is surrounded by a protruding edge portion 19 for centring the received cleaning body, as shown in FIGS. 1 and 2. The edge portion 19 is, for example, formed in the manner of a polygon 25, which is formed as an octagon in this case. Said edge portion may also be provided with a shoulder and/or a contact surface that is inclined radially to the rotational axis 20, for a complementarily formed fastening portion (not shown) of the cleaning body.

In the case of a flange surface which has a diameter that is smaller than, equal to or larger than the diameter of the cleaning body surface, the edge portion 19 extends beyond the peripheral edge of the cleaning body preferably for complete and stabilised receiving of the cleaning body 2, ends flush with said edge or is fastened to the diametrically larger cleaning body by a shoulder portion that matches in diameter.

The fastening portion 17 is formed having a fastening means (not shown) on its upper side at least in part, for example a Velcro fastener for releasably fastening the cleaning body 2, an adhesive fastener or another means for non-positive and/or positive connection.

When putting the device into operation, the user interconnects the fastening means of the cleaning body 2 and the associated fastening means of the fastening portion 17 of the housing 7 such that the cleaning body 2 comes into contact, in a fastened manner, with the fastening portion 17 of the housing 7. In this case, the projecting edge portion 19 of the housing 7 centres the cleaning body 2, and the polygon 25 functions as a positive anti-turn mechanism for the cleaning body 2 on the housing 7.

In order to improve absorption of radial forces, the fastening portion 17 may also be modified such that the projecting edge portion 19 is reinforced with material and/or is formed radially to the rotational axis and having an inclined contact surface.

For a cleaning process, the fastening portion 1 may be rotated about the rotational axis 20 either manually or in a machine-controlled manner. In the process, the drive shank 11 that is formed having a polygonal shank 12 may, in the case of a machine-controlled drive, be inserted into a drill chuck, for example of a drill or the like.

In the case of releasable Velcro connection to the housing 7, the cleaning body 2 may be manually removed from the fastening portion 17 and replaced in a simple manner.

FIG. 3 is a perspective view of an example cleaning body 2 of the cleaning device 1 according to an embodiment of the present invention. As is clear from FIG. 3, the cleaning body 2 preferably comprises a discoid stabilising plate 3 and a centring pin 4 integrally formed in the centre of said plate. The centring pin 4 preferably projects centrally from the stabilising plate 3 in the direction away from the housing. The centring pin 4 preferably has a circular cross-sectional shape. However, it is obvious to a person skilled in the art that a different geometrical design of the centring pin 4 is also possible, for example a polygonal or other multi-sided cross-sectional shape or the like.

For example, the stabilising plate 3 and the centring pin 4 can be formed integrally with one another. However, it is obvious to a person skilled in the art that a different design is also possible.

Furthermore, both the stabilising plate 3 and the central centring pin 4 have a central opening 6, said openings 6 preferably being mutually aligned, in order to be able to receive any axles, bearings or shafts.

The provided geometrical dimensions and materials of the stabilising plate 3 and of the centring pin 4 can be selected according to the particular uses and to the particular housing 7 that is used. In particular, the height and the diameter of the stabilising plate 3 and of the centring pin 4 can be modified accordingly.

According to the present embodiment, the surface of the stabilising plate 3 that faces away from the housing 7, and the outer peripheral surface of the centring pin 4, are equipped with a cleaning means 5. The cleaning means 5 is, for example, a rough abrasive material or the like. The exact material design and the exact geometrical dimension, in particular the thickness of the abrasive material, can in turn be accordingly adapted to the particular use.

For example, the abrasive 5 is adhesively bonded to the surfaces of the stabilising plate 3 and of the centring pin 4 that are associated in each case. It is obvious to a person skilled in the art that other attachment options may also be used.

Thus, in comparison with conventional devices, the present invention has the advantage that, when a wheel rim contact surface is being cleaned, the centring pin, which can be introduced into the bearing aperture of the rim, suitably prevents the cleaning device from slipping eccentrically, and therefore no damage can be caused to the wheel rim or the tool, in particular when the contact pressure is high, and, when the inside of a rim of a motor vehicle is being cleaned for example, not only is the planar rim contact surface cleaned of rust oxidation and dirt, but also the inside of the rim opening and/or of the bearing aperture is cleaned of rust oxidation and dirt by means of the provided centring pin 4 comprising applied cleaning means 5.

If it is then intended that a mating contact surface having a projecting axle or shaft should be cleaned, the cleaning body 2 can be removed from the housing 7 of the device 1 in a simple manner and replaced by a differently designed cleaning body, which is formed without a centring pin 4 of this type for example.

Although the present invention has been described with reference to preferred embodiments herein, it is not limited thereto, but can be modified in various ways.

The invention claimed is:

1. A cleaning device for at least one of cleaning and polishing a surface having an aperture, the cleaning device comprising:
   a housing, which comprises a rear rotary portion for rotating the housing about a rotational axis, and
   a front fastening portion for releasably fastening a cleaning body;
   wherein the cleaning body comprises
   a stabilising plate, facing the housing and including a centring pin, the centring pin being formed integrally in the center of the stabilising plate and projecting centrally from the stabilising plate in a direction away from the housing, and
   a rough abrasive material that covers the surface of the stabilising plate that faces away from the housing; and
   wherein the fastening portion and the stabilising plate are each formed having a corresponding fastener for rotationally stable connection to one another.

2. The cleaning device of claim 1, wherein the outer peripheral surface of the centring pin is also formed having the covering rough abrasive material.

3. The cleaning device of claim 1, wherein the centring pin has a circular or polygonal cross-sectional shape.

4. The cleaning device of claim 1, wherein the fastening portion comprises an edge portion for centring the received cleaning body.

5. The cleaning device of claim 1, wherein the rough abrasive material is securely attached to at least one of the stabilising plate and the centring pin with an adhesive bond.

6. The cleaning device of claim 1, wherein the fastening portion, the stabilising plate and the centring pin each have a central opening.

7. The cleaning device of claim 1, wherein the cleaning device has an anti-turn mechanism in the form of at least one of an edge, a polygon and an adhesive agent.

8. The cleaning device of claim 1, wherein the housing is made of polyoxymethylene or aluminium.

9. A cleaning body for at least one of cleaning and polishing a surface having an aperture, wherein the cleaning body comprises a stabilising plate, facing a housing of a cleaning device and including a centrically projecting centring pin that is formed integrally in the center of the stabilising plate and projects centrally from the stabilising plate in a direction away from the housing, and a rough abrasive material that covers the surface of the stabilising plate that faces away from the housing.

10. The cleaning body of claim 9, wherein the outer peripheral surface of the centring pin is also formed having the covering rough abrasive material.

11. The cleaning body of claim 9, wherein the centring pin has a circular or polygonal cross-sectional shape.

12. The cleaning body of claim 9, wherein the rough abrasive material is securely attached to at least one of the stabilising plate and the centring pin with an adhesive bond.

13. The cleaning body of claim 9, wherein the stabilising plate and the centring pin each have a central opening.

14. The cleaning device of claim 6, wherein the openings are mutually aligned for receiving a shaft or axle.

15. The cleaning body of claim 13, wherein the openings align with one another for receiving a shaft or axle.

16. A cleaning device for at least one of cleaning and polishing a surface having an aperture, the cleaning device comprising:
   a housing, which comprises a rear rotary portion for rotating the housing about a rotational axis, and
   a front fastening portion for releasably fastening a cleaning body,
   wherein the cleaning body comprises
   a stabilising plate, facing the housing and including a centring pin, the centring pin being formed integrally in the center of the stabilising plate and projecting centrally from the stabilising plate in a direction away from the housing,
   a rough abrasive material that covers the surface of the stabilising plate that faces away from the housing,
   wherein the fastening portion and the stabilising plate are each formed having a corresponding fastener for rotationally stable connection to one another, and
   wherein the centring pin has a polygonal cross-sectional shape.

* * * * *